T. G. DOROUGH.
STERILIZER.
APPLICATION FILED JULY 1, 1915.
1,193,129.
Patented Aug. 1, 1916.
2 SHEETS—SHEET 1.
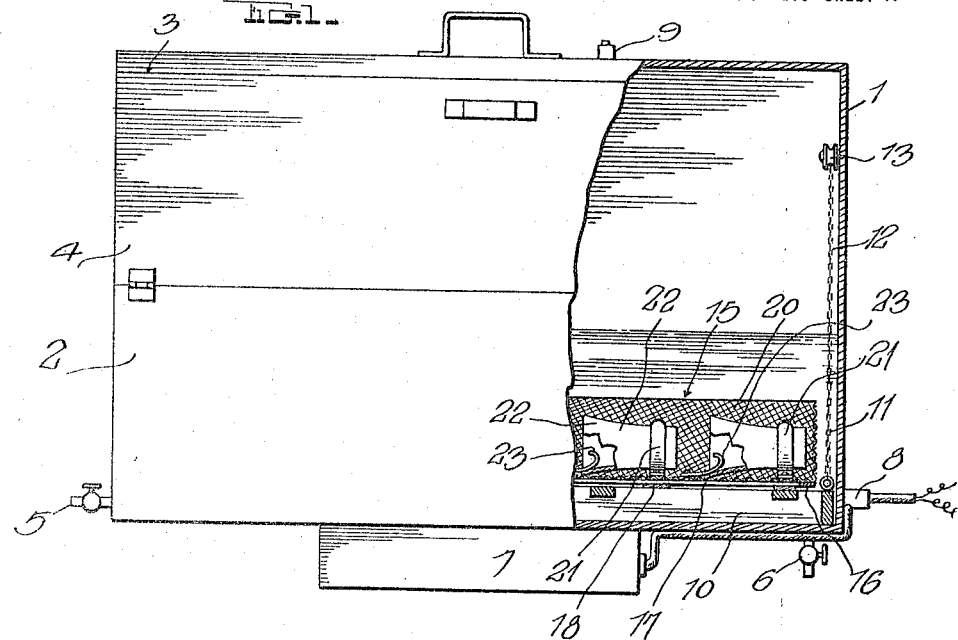
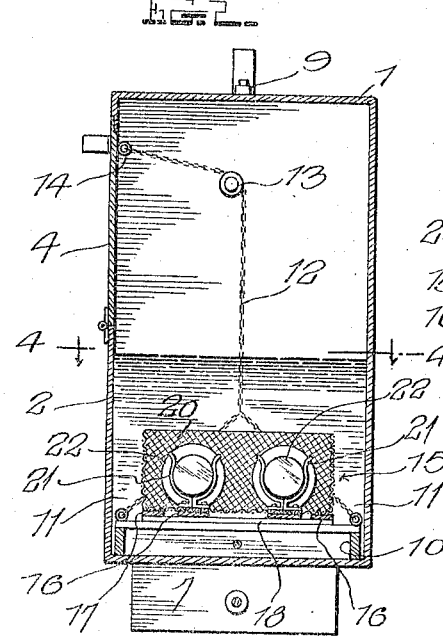
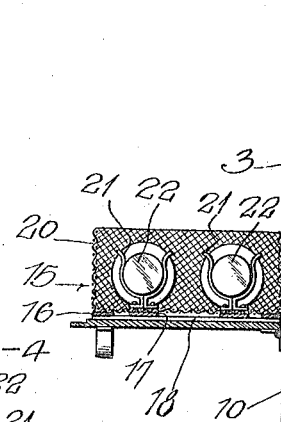
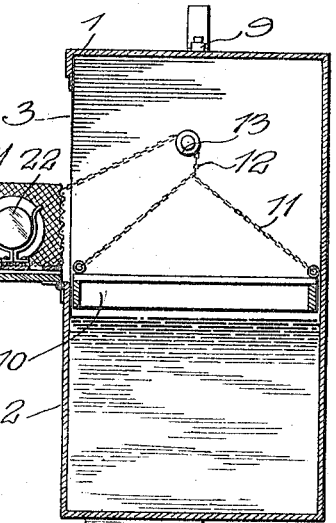
Witnesses
H. Woodard
Inventor
T. G. Dorough
By H. B. Willson & Co.
Attorneys

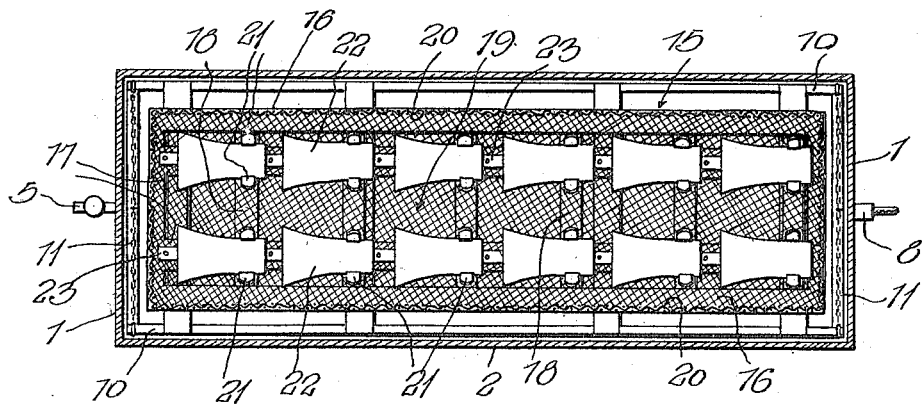
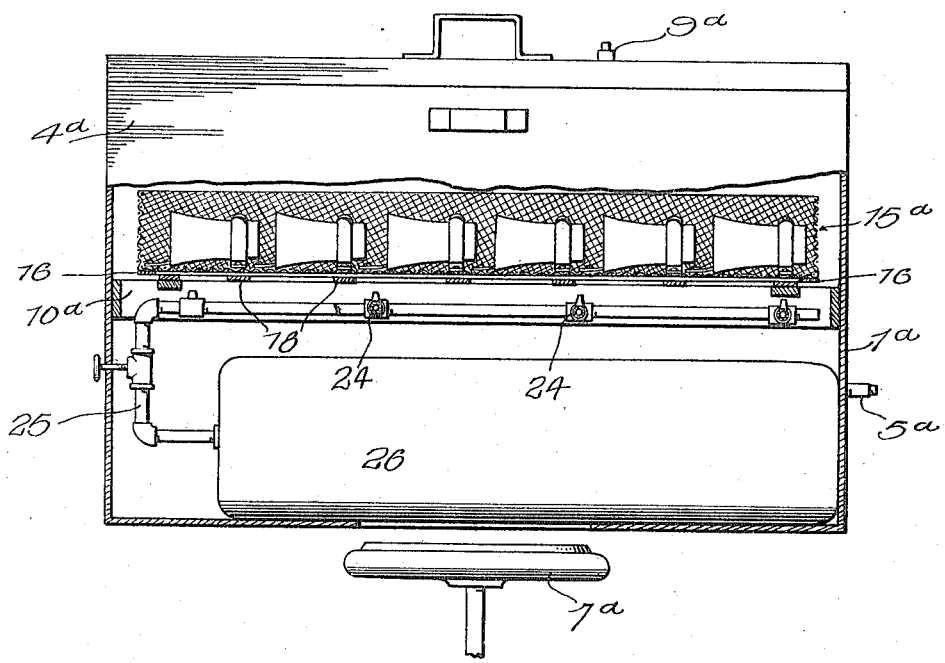

UNITED STATES PATENT OFFICE.

TRAUIS G. DOROUGH, OF ROYSTON, GEORGIA.

STERILIZER.

1,193,129.     Specification of Letters Patent.     Patented Aug. 1, 1916.

Application filed July 1, 1915. Serial No. 37,559.

*To all whom it may concern:*

Be it known that I, TRAUIS G. DOROUGH, a citizen of the United States, residing at Royston, in the county of Franklin and State of Georgia, have invented certain new and useful Improvements in Sterilizers; and I do declare the following to be a full, clear, and exact description of the invention, such as will enable others skilled in the art to which it appertains to make and use the same.

My invention relates to useful improvements in sterilizing devices, more particularly to those designed primarily for the sterilizing of tumblers, ice cream dishes, cups, and various other styles of table articles.

The object of the invention is to provide a sterilizer of this class which although being very simple and comparatively inexpensive, will be highly efficient and durable, and will possess a number of advantageous characteristics.

With this general object in view, the invention resides in certain novel features of construction and in the unique combinations of parts hereinafter fully described and claimed, the descriptive matter being supplemented by the accompanying drawings wherein like reference characters designate corresponding parts throughout the several views and wherein:—

Figure 1 is a front elevation partly in section of one type of sterilizer constructed in accordance with my invention; Figs. 2 and 3 are vertical transverse sections of the device showing different positions of parts; Fig. 4 is a horizontal section as seen along the plane indicated by the line 4—4 of Fig. 2; and Fig. 5 is a longitudinal sectional view partly in elevation showing a different type of sterilizer.

In the embodiment of the invention illustrated in Figs. 1 to 4 inclusive, the numeral 1 indicates an upright rectangular casing having in its front wall 2, a door opening 3 adjacent the upper end of such wall, said opening being normally closed by a downwardly swinging hinged door 4. The portion of the casing 1 beneath the door opening 3, constitutes a receptacle in which water is to be boiled for the purpose of sterilizing articles placed in the machine in a manner yet to be described.

For the admission of water into the lower end of the casing 1, the valved inlet pipe 5 is provided, while in order to discharge fluid from said casing, the valved drain pipe 6 is used, the latter being of course closed when the inlet is opened, whereby an appropriate amount of water may be trapped in the lower end of the casing, such water being then heated to the necessary temperature by any preferred type of heating device, such a device being diagrammatically illustrated at 7 in the accompanying drawings. The device 7 is preferably in the form of an electric heater, in which case a suitable socket 8 will be provided adjacent one end of the casing for the attachment of the current conducting wires, but equally as desirable results may be gained by using other forms of heaters. Regardless of the type of heater employed, the casing 1 is preferably provided with a safety or blow-off valve 9.

Movable vertically in the lower end of the casing 1, is a rectangular horizontally disposed rack 10 from whose corners chains or the like 11 rise, the chains at each end of the rack being converged upwardly and connected to the two additional chains 12 as clearly disclosed in Figs. 2 and 3. The intermediate portions of the chains 12 are passed over pulleys or other appropriate guides 13 mounted adjacent the inner sides of the opposite upright end walls of the casing 1, near the upper edges thereof, while the ends of said chains remote from their points of connection with the chains 11, are secured at 14 to the opposite ends of the hinged door 4. The length of the numerous chains is such as to allow the rack 10 to be positioned in the bottom of the casing 1 when the door is closed, but when said door is swung outwardly to the position or to approximately the position shown in Fig. 3, said rack will be so raised as to cause its upper side to lie flush with what is now the upper side of the door 4. This is highly essential since it provides for easily inserting and removing a tray 15 for the reception of the articles to be sterilized.

The tray 15 includes a rectangular horizontally disposed frame 16 which rests slidably upon the rack 10 when the device is in use, but which may be drawn forwardly from said rack onto the door 4, when the latter is opened. Secured at their opposite ends to the ends of the frame 16, are the longitudinally disposed strips or bars 17, while disposed transversely of the frame and therefore crossing the bars 17, are the additional bars 18, this construction constituting an open work tray member through which water may freely pass.

Secured at its edges to the frame 16 and reliably supported by the crossed bars 17 and 18, is a foraminous bottom 19 which is here shown as formed of reticulate material, while rising from the edges of said bottom is a continuous wall 20 preferably formed of the same class of material used in the construction of said bottom.

By constructing the tray in the manner so far set forth, it will be evident that the same will serve effectively as retaining means for numerous kinds of dishes and other articles to be sterilized, but in connection with such construction, it becomes highly expedient to provide effective means for reliably holding tumblers in spaced relation, whereby contact and possible breakage thereof is avoided. For accomplishing this end, a plurality of U-shaped spring clips 21 is secured to the open work structure formed by the crossed bars 17 and 18, such clips being shown in the present embodiment of the invention as secured at the intersection of such bars and as having their arms disposed above the transverse bars 18. The clips 21 are designed to yieldably grip the bodies of the tumblers 22, while the edges or rims thereof are received in additional spring clips 23 which are spaced longitudinally from the clips 21 and are here shown as secured to the longitudinal bars 17. By this system of spring clips, the tumblers or glasses will be effectively held against contact with each other regardless of the currents prevailing in the boiling water.

In operation, an appropriate amount of water is allowed to enter the casing 1 through the inlet 5, after which the heating device 7 is applied to use to boil said water, the door 4 of the casing being in the meantime closed thus allowing the rack 10 to lower whereby the tray 15 and all parts carried thereby, will be heated to the same temperature as the water. When now tumblers or the like are to be sterilized, the door is opened to the position seen in Fig. 3 and the tray is withdrawn, whereupon such tumblers may be inserted in the clips before described. An important feature to be now considered is the fact that such an amount of the heat from the numerous clips as well as from the entire tray, will be transferred to the tumblers, as to positively prevent the breakage thereof when inserted into the boiling water, this being a rather salient feature.

In Fig. 5, a slightly different type of the invention is shown in which 1ª indicates a rectangular casing having a door opening normally closed by a hinged door 4ª which swings downwardly, a permanent non-movable rack 10ª being disposed horizontally in said casing directly beneath the hinges of the door. This rack 10ª supports thereon a removable tray 15ª which is constructed in precisely the same manner as the tray 15 previously described. In this form of the invention, however, the tray is not raised and lowered, but sterilization of the contents thereof is effected by projecting jets of steam from a plurality of crossed steam pipes 24 which are supplied through a valved pipe 25 from any appropriate type of boiler 26 in the casing 1 beneath the rack 10ª, water being fed to said boiler through an appropriate valved inlet 5ª and being heated therein by any preferred type of heater 7ª. As in the case with the form of the device previously described, a blow-off valve 9ª is provided for the relief of excessive steam pressure within the casing. The type of sterilizer last described will be found to be equally as efficient as the form first explained, regardless of the fact that it is more simple.

From the foregoing description, taken in connection with the accompanying drawings, it will be evident that the improved sterilizer will possess a number of advantageous features and will be highly efficient and durable, in spite of the fact that it is simple and inexpensive.

In the drawings, certain specific details of construction have been shown for accomplishing probably the best results, and in the preceding such details have been described, but it will be evident that I need not be restricted thereto otherwise than to the extent to which the appended claims limit me.

I claim:

1. A sterilizing apparatus of the class described comprising an upright rectangular casing adapted to contain a sterilizing medium, the front upright side of said casing, near its upper end, having formed therein a horizontally elongated door opening, a door for said opening hinged at its lower edge to the front of the casing and adapted to swing forwardly to a horizontal position, a horizontally disposed rack in the casing, the upper face of the aforesaid door being disposed in the same horizontal plane with the upper face of said rack when said door is opened, and a tray resting slidably on said rack, whereby it may be moved forwardly therefrom onto the aforesaid door when the latter stands in its open horizontal position, said tray being adapted to contain the articles to be sterilized.

2. A sterilizing apparatus of the class described comprising an upright rectangular casing having in its upright front side a horizontally elongated door opening disposed near the upper edge of said side, the lower portion of said casing being adapted to contain a disinfecting liquid, a door for the aforesaid opening hinged at its lower edge to the front side of the casing and adapted to swing forwardly to a horizontal position, a horizontal rack mounted for vertical movement in the casing and normally received in the lower portion thereof, operating means connecting the door and the rack for moving the latter vertically to position its upper side in the same plane with the upper side of the door when the latter is swung to its open horizontal position, and a tray resting slidably on said rack and adapted to be moved forwardly therefrom onto the open door, said tray being adapted for the retention of the articles to be sterilized.

3. In a sterilizing apparatus, a casing adapted to contain a sterilizing medium, and a tray in said casing, said tray consisting of a rectangular frame disposed in a horizontal plane, a plurality of parallel longitudinal bars secured at their ends to the end bars of said frame, a plurality of transverse bars crossing said longitudinal bars and secured at their ends to the side bars of the frame, a foraminous tray bottom resting on the frame and the longitudinal and transverse bars, a continuous foraminous side wall rising from the edge of said bottom, a plurality of U-shaped spring clips disposed transversely of the tray and positioned in contact with the bottom directly above the crossing points of the longitudinal and transverse bars, said clips being adapted to embrace the body portions of tumblers to be sterilized, upright fasteners passing through said clips, through the longitudinal and transverse bars at the crossing points thereof, and through the intervening bottom, additional clips secured to the longitudinal bars at points spaced from the U clips, said additional clips opening toward the latter and being adapted to receive the edge of the tumblers gripped thereby.

In testimony whereof I have hereunto set my hand in presence of two subscribing witnesses.

TRAUIS G. DOROUGH.

Witnesses:
J. F. LEE,
I. A. BREED.

Copies of this patent may be obtained for five cents each, by addressing the "Commissioner of Patents, Washington, D. C."